United States Patent Office 3,790,671
Patented Feb. 5, 1974

3,790,671
FIBRINOLYTIC ACTIVATORS
Alexander Kennedy Sim, 21 Wellside Place,
Falkirk, Scotland
No Drawing. Filed Dec. 23, 1971, Ser. No. 211,686
Claims priority, application Great Britain, Apr. 13, 1971,
9,195/71
Int. Cl. A61k 27/00
U.S. Cl. 424—230            4 Claims

ABSTRACT OF THE DISCLOSURE

This invention relates to the treatment of thrombosis and prethrombosis conditions by promoting solution of intravascular blood clots. The treatment provided by the invention comprises the administration, orally, parenterally or topically of a compound of the formula

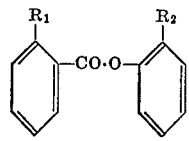

in which $R_1$ is a substituent selected from the group consisting of an alkyl ester radical and an hydroxyl group and $R_2$ is a carboxyl radical.

BACKGROUND OF THE INVENTION

Von Kaulla (Arch. Biochem. Biophys., 96.4) showed that certain aromatic compounds and urea derivatives when dissolved in human plasma enhance urokinase activity, and induce digestion of preformed clots after coagulating with thrombin. This worker had hinted at such a possibility in 1961, suggesting that the breakdown of fibrin by denaturation may be an indispensable prerequisite for enzymatic hydrolysis. It was shown that a plasma clot in the presence of 3% ethyl carbamic acid ethyl ester or 2% of α-allylthiourea undergoes slow spontaneous dissolution on incubation, and that rapid solution occurs if urokinase is also present.

Later work (Thromb-et Diath—Haem., 1,404.) showed that hydrotrophy i.e. the solubilizing properties of the compounds, was probably a common denominator of the compounds tested.

O-thymotic acid was shown to be among the most active compounds reported in the literature (J. Medicinal Chem., 8,164) whereas salicylic acid was inactive.

SUMMARY OF INVENTION

The invention provides a method for the treatment of thrombosis and prethrombosis conditions by promotion of solution of intravascular blood clots, the treatment comprising the administration, orally, parenterally or topically of a compound of the formula

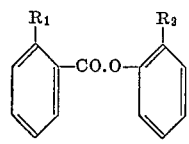

in which $R_1$ is a substituent selected from the group consisting of an alkyl ester and an hydroxyl group and $R_2$ is a carboxyl radical. Salts, including acid addition salts, of the above compounds are also effective. The treatment of the invention includes the administration of a pharmaceutical composition comprising a pharmaceutically acceptable solid or liquid carrier or diluent and the active compound as defined above or a salt or acid addition salt thereof.

The invention is particularly suitable for the treatment of "high risk condition" resulting from coronary thrombosis or other vascular occlusion such as peripheral occlusion, cerebral occlusion, renal occlusion, retinal occlusion, and deep vein thrombosis. Treatment will normally take the form of the administration of 300 to 600 mg. of the active constituent twice or thrice daily.

The compounds for use in the treatment method are:

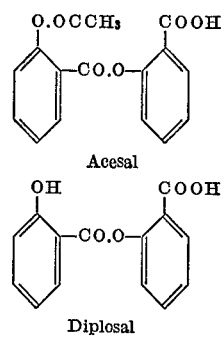

The active components used in the treatment method of the invention are found to have good activity in lysing clots, and are of relatively low toxicity and high activity.

Compositions used in the invention will generally be made up in unit dose form such as a tablet comprising the active compound together with a suitable solid carrier such as talc or calcium carbonate and anhydrous citric acid or in parenteral form comprising a solution or suspension of the active compound. Alternative formulations may be used if desired, for instance a cream containing the active compound may be most convenient for topical application. All such formulations can contain other additives normally present in pharmaceutical products such as binders and in compositions for oral administration, flavoring agents. A convenient presentation is a slow release preparation, for example a multilayer tablet, an enteric coated tablet or formulations involving microencapsulation of the active ingredient. Alternatively the preparation may contain inert constituents designed to promote rapid release of the active agent, for example lactose or starch.

In some instances, where a solid preparation for oral administration is formulated it is advisable to include a solubilizing agent, for example sodium bicarbonate.

It is possible to prolong the duration of action of the compositions of the invention by using the active constituent in the form of a glycine or similar salt.

The lysine ability of the active compounds depends upon the circumstances for example the size of the clot, the intrinsic fibrinolytic activity of the individual and the presence of antiactivators in the plasma.

Since activators from natural sources (other than urokinase) are also antigenic the normal titre of the patient (for example to streptokinase) must be assessed before treatment so that the correct doses may be administered. This antigenicity naturally leads to eventual immunity to the drug in the patient.

The activity of the compounds can be compared in vitro or in vivo with urokinase which is currently used as a fibrinolytic activator. This, and other such enzymes are administered by infusion, of the order of 25,000 units per hour. The effect falls off rapidly when the infusion is stopped.

The synthetic activators described above have been shown to be effective in vivo for up to 24 hours after a single dose of the order of 600 mg. They are nonantigenic, and are apparently free from the untoward side effects observed from the use of enzymes. Smaller doses are required to produce a sustained effect.

The test methods used were the measurement of the euglobulin and dilute clot lysis times (Von Kaulla, K. N. [1963] in "Chemistry of Thrombolysis" Pub. Thomas, Illinois, p. 79; Fearnley, G. R. [1965] in "Fibrinolysis," Pub. Arnold (London) p. 30) the latter is the DCLT referred to in the table on page 7.

What I claim is:

1. A method for the solubilizing of intravascular blood clots in a patient having a thrombosis or prethrombosis condition which comprises administering thereto an effective amount of salicylosalicylic acid or acetylsalicylosalicylic acid.
2. The method of claim 1 wherein the amount administered is from 300 to 600 mg. daily.
3. The method of claim 1 wherein acetylsalicylosalicylic acid is administered.
4. The method of claim 1 wherein salicylosalicylic acid is administered.

CLOT LYSIS TIMES (EUGLOBULIN AND DILUTE CLOTS) IN HUMANS BEFORE AND AFTER INGESTION OF 600 mg. ACESAL

[Double blind: Results—mean of duplicate determination]

|  | Euglobulin clot lysis time (ELT) in minutes | | | | Dilute clot lysis time (DCLT) in minutes | | | |
| --- | --- | --- | --- | --- | --- | --- | --- | --- |
| Hours after drug ingestion | 0 | 2 | 4 | 24 | 0 | 2 | 4 | 24 |
| Subject: | | | | | | | | |
| A | 540 | 360 | 540 | | 700 | 200 | 400 | |
| B | >800 | 300 | 450 | 840 | 470 | 390 | 385 | 400 |
| C | >800 | 322 | 480 | 880 | ¹22 | 390 | 400 | 900 |
| D | 720 | 360 | 480 | 800 | 1,000 | 660 | 400 | 1,000 |
| E | 169 | 143 | 127 | | 320 | 185 | 240 | |
| Hours after drug ingestion | 0 | 1 | 2 | 4 | 0 | 1 | 2 | 4 |
| Subject: | | | | | | | | |
| F | 720 | 411 | 362 | 216 | 575 | 570 | 445 | 225 |
| G | 398 | 220 | 244 | 172 | 460 | 350 | 445 | 335 |
| H | 285 | 236 | 260 | 173 | 260 | 355 | 275 | 335 |
| J | | | | | 1,440 | 600 | 600 | 1,44 |
| K | | | | | 270 | 210 | 157 | 200 |
| L | | | | | 165 | 190 | 205 | 240 |

¹ Hours.

NOTE.—Clot lysis times most markedly affected by acesal ingestion appear to be those with the highest control values. This suggests that the drug may operate in a normalizing fashion with little or no effect on a short (presumably normal) clot lysis time. (No figures available.)

References Cited

FOREIGN PATENTS 1,019,146  2/1966  Great Britain _____ 424—230

OTHER REFERENCES

Chemical Abstracts, vol. 56, p. 5340 (1962); vol. 62, p. 16805 (1965).

ALBERT T. MEYERS, Primary Examiner

F. E. WADDELL, Assistant Examiner